No. 610,431. Patented Sept. 6, 1898.
W. H. CROSSLEY.
VALVE FOR PNEUMATIC TIRES.
(Application filed May 22, 1897.)

(No Model.)

Witnesses
C. Bradway
Edwin Cruise

Inventor
William H. Crossley
By his Attorneys,
C. A. Snow & Co.

THE NORRIS PETERS CO., PHOTO-LITHO., WASHINGTON, D. C.

UNITED STATES PATENT OFFICE.

WILLIAM H. CROSSLEY, OF BLOOMSBURG, PENNSYLVANIA, ASSIGNOR OF ONE-HALF TO GEORGE W. MIFFLIN, OF SAME PLACE.

VALVE FOR PNEUMATIC TIRES.

SPECIFICATION forming part of Letters Patent No. 610,431, dated September 6, 1898.

Application filed May 22, 1897. Serial No. 637,713. (No model.)

*To all whom it may concern:*

Be it known that I, WILLIAM H. CROSSLEY, a citizen of the United States, residing at Bloomsburg, in the county of Columbia and State of Pennsylvania, have invented a new and useful Valve for Pneumatic Tires, of which the following is a specification.

My invention relates to inflating-valves for pneumatic and analogous inflatable tires; and the object that I have in view is to provide an improved construction of valve which is so positioned on the tire that access may easily be obtained thereto for connecting and disconnecting the inflating-pump.

A further object that I have in view is to provide an improved valve in which provision is made for thoroughly excluding accumulations of dirt in the valve and which does not interfere with the ready attachment of the inflating-valve to the tire.

With these ends in view my invention consists in the combination, with an inflatable tire, of a tubular valve-casing secured in the tread-surface of the tire to be flush therewith, a valve within the casing, and a solid plug removably secured within the outer end of the valve-casing to be flush with the outer end of the valve-case and the tread-surface of the tire and thus exclude dirt from the valve-casing; and the invention further consists in the novel construction and arrangement of parts which will be hereinafter fully described and claimed.

Figure 1:
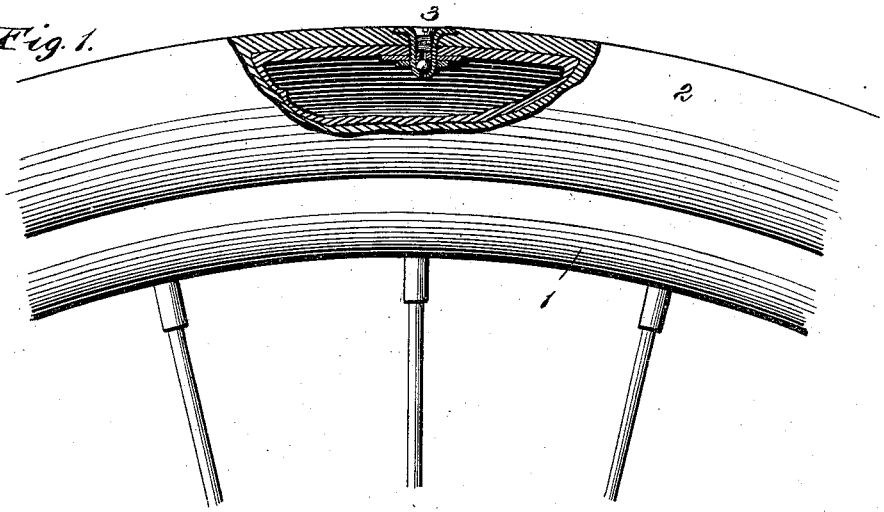
Figure 2:
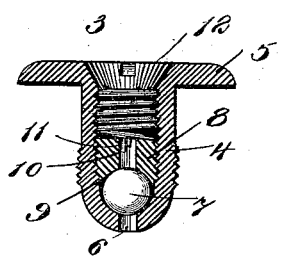
Figure 3:
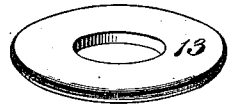
Figure 3:
Figure 3:
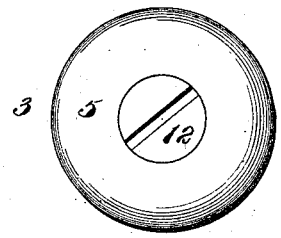
Figure 4:
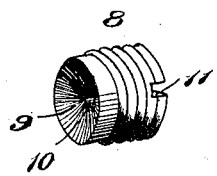

In the drawings, Figure 1 is a side elevation of a portion of a pneumatic tire, partly broken away to show the valve, which latter is in section. Fig. 2 is an enlarged sectional view of the valve detached and showing also in perspective the washer and clamping-nut separated from the valve. Fig. 3 is a top plan view of the valve. Fig. 4 is a perspective view of the adjustable plug detached.

Similar reference-numerals indicate similar parts in the several figures.

1 indicates the rim of the wheel, and 2 the pneumatic tire. As illustrated in the drawings, the tire consists of an outer casing and an inner tube, into which the air is pumped in order to inflate the tire. It is, however, understood that my invention is applicable to any of the several forms of pneumatic tires at present in use. The valve is indicated by 3 and, as shown, is secured in the tread portion of the tire. The valve consists of a tube 4, provided at its upper end with an annular flange 5, which engages the outer face of the tire. The lower or inner end of the tube is hemispherical in form and is provided with an opening 6 for the passage of the air into the inner tube.

7 indicates a ball, preferably made of rubber or some other suitable elastic material, and this ball is supported within the tube at its lower end and is adapted, when compressed, to seal the opening 6. The tube 4 is threaded interiorly, and an exteriorly-threaded plug 8 is fitted within the tube and serves to compress the ball 7 in order to seal the opening 6. The lower end of the plug 8 is concaved, as indicated at 9, to fit over the ball 7, and the plug is provided with a central bore 10 for the passage of air from the pump. The upper end of the plug is provided with a transverse slot 11 for the reception of a screw-driver or similar tool, by means of which the plug can be adjusted up or down within the tube. The outer end of the bore of the tube 4 is countersunk to receive the head of a screw 12, which is fitted into the upper end of the tube and serves as a stopper to prevent access of dirt to the interior of the valve. A suitable opening will be formed in the tire for the reception of the tube 4, and the latter will be clamped firmly in position by means of a washer 13, which will fit over the lower end of the tube 4 and engage the inner face of the tire and a nut 14, which will screw onto the lower threaded end of the tube 4, and thereby clamp the valve securely in position, and when the nut is screwed up tightly the flange 5 will embed itself in the outer casing sufficiently to bring the upper face of the valve practically flush with the periphery of the tire.

In order to inflate the tire, the stopper 12 will be removed and the plug 8 moved upwardly—say about an eighth of an inch—in order to release the ball 7. The pump will then be attached to the upper end of the valve in the usual manner and the tube inflated in the ordinary way. As soon as sufficient air is pumped in the tube the pump will be detached from the valve and the outward pressure of the air within the tire will cause the ball 7 to seat itself in the concaved end of the plug 8, and thereby close the opening 10 and prevent the escape of air during the short period that will be necessary to turn the plug down in order to compress the ball in the lower end of the tube and seal the opening 6. The stopper 12 will then be screwed into its proper position and the operation will then be completed.

By the use of my invention it will be much easier to connect and disconnect the pump from the valve than it is to valves projecting through the rim of the wheel between the spokes. In the latter case the spokes interfere materially with the attachment of the pump, and it is often a tedious matter to properly connect them. A further advantage is that no part of the valve projects beyond the tire of the wheel, and the wheel will consequently have a much better finish, and there will be less danger of any portion of the valve being accidentally broken. It is also well known that when the valve projects through the rim of the wheel it is frequently cut loose from the tire by the creeping of the latter on the rim. This defect is wholly overcome by the use of my invention, for it is obvious that any creeping of the tire upon the rim will not affect the valve in the slightest degree.

In the above description and in the following claims by the expression "tread portion of the tire" I do not intend to limit myself to that portion of the tire which actually engages the ground, but include therein all that portion of the tire which is exposed or outside of the rim.

When the valve is applied to tires during their manufacture, the valve is vulcanized to the outer casing and the tube 4 inserted through an opening in the inner tube near one end before it is made endless, and the washer 13 and nut 14 can be secured in position from the open end. When the valve is applied to a tire which already has a valve extending through the rim, it will be first secured in the outer casing directly opposite the original valve, which is always near the usual opening in the outer casing through which the inner tube is inserted or withdrawn. The old valve-stem is then removed from the inner tube, and this leaves an opening through which the washer 13 and nut 14 can be inserted, and another small opening is made in the inner tube directly opposite for the passage of the valve-tube 4, which is already secured to the outer casing, and the washer and nut are then secured on the tube through the opening made by removing the old valve-stem. This latter opening is then closed by a patch, and the inner tube can then be inflated through the valve in the tread portion of the tire.

What I claim is—

1. The combination with a pneumatic tire, of a valve embedded in the center line of its tread, said valve having its inlet closed by a plug terminating flush with the outer surface of the tire, as set forth.

2. The combination with a pneumatic tire, of a valve provided at its outer end with an annular flange to engage the tread-surface of the tire and be flush therewith, a washer loosely fitting over the inner end of the valve to engage the inner face of the tire, and a nut threaded on the inner end of the valve to clamp the valve to the tire, substantially as described.

3. The combination with a pneumatic tire, of an inflating-valve consisting of a tube having an annular flange at its outer end to engage the tread portion of the tire and the inner end of the said tube being hemispherical and provided with an opening for the passage of air to the interior of the tire, said tube being interiorly threaded, an elastic ball supported within the tube at its lower end, and an adjustable plug within the tube above the ball to compress the latter, a stopper removably fitted in the outer end of the tube, and means to clamp the tube to the tire, substantially as described.

4. The combination with a pneumatic tire, of an inflating-valve firmly secured in the tire at its tread portion to be flush therewith, said valve having an interiorly-threaded tubular portion extending into the tire, the lower end of the tube being hemispherical in form and provided with an opening for the passage of air, a compressible ball supported within the tube at its lower end, and an adjustable threaded plug within the tube above the ball, said plug having a central air-passage and its lower end being concave to fit over the ball, and a removable screw-stopper to close the outer end of the valve, substantially as described.

5. The combination with a pneumatic tire, of a valve secured in the tread portion of the tire, said valve consisting of a tube having an annular flange at its outer end to engage the outer face of the tire, and its lower end being hemispherical and provided with an opening for the passage of air, said tube being threaded interiorly and exteriorly, an elastic ball supported within the tube at its lower end, a threaded plug fitted in the tube above the ball and having its lower end concave to fit over the ball, said plug having a central air-passage and a transverse slot in its upper end, a screw-stopper to close the upper end of the tube, a washer to fit over the lower end of the tube and engage the inner face of the tire, and a nut on the inner end of the tube to engage the washer and clamp the valve in position, substantially as described.

6. The combination with a pneumatic tire, of a tubular valve-casing secured in the tread-surface of the tire to be flush therewith, a valve within the casing, and a solid plug removably secured within the outer end of the valve-casing to be flush with the outer end of the valve-case and the tread-surface of the tire and thus exclude dirt from the valve-casing, substantially as set forth.

7. The combination with a pneumatic tire, of a valve-casing secured in an exposed part of the tire beyond the wheel-rim and having its outer exposed part flush with said tire, a perforated valve-plug secured within the valve-casing, and a solid stopper-plug also secured wholly within the valve-casing beyond the valve-plug therein and lying flush with the exposed edge of the valve-casing, whereby said stopper-plug excludes dirt from entering the valve-casing and it is prevented from protruding beyond the tire, as set forth.

8. The combination with a pneumatic tire, of a threaded valve-casing secured in a part of the tire exposed beyond the wheel-rim and having its flanged open mouth seated flush with said tire, a valve fitted within said casing, and a threaded, solid stopper-plug screwed into the valve-casing wholly within and independently of the valve therein to lie flush with the exposed flanged mouth of the valve-casing, and provided in its exposed face with means for the reception of a suitable tool to adjust the stopper-plug, substantially as and for the purposes described.

In testimony that I claim the foregoing as my own I have hereto affixed my signature in the presence of two witnesses.

WILLIAM H. CROSSLEY.

Witnesses:
JOHN H. SIGGERS,
FRANCES PEYTON SMITH.